Figure 1:
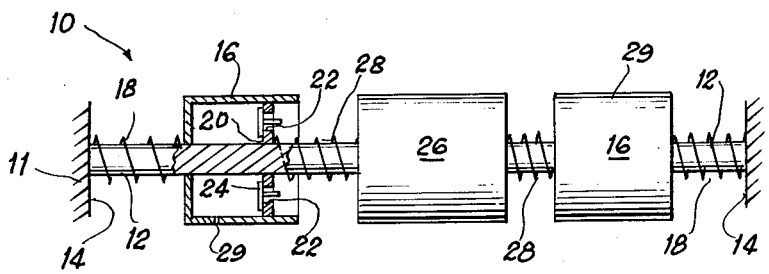

May 28, 1963     J. B. TIEDEMANN ET AL     3,091,307
IMPACT VIBRATION DAMPER AND CONTROL MEANS THEREFOR
Filed Oct. 16, 1961

James B. Tiedemann
Donald E. Wall
          INVENTORS

United States Patent Office 3,091,307
Patented May 28, 1963

3,091,307
IMPACT VIBRATION DAMPER AND CONTROL MEANS THEREFOR
James B. Tiedemann, Lawrence, Kans., and Donald E. Wall, Minneapolis, Minn., assignors to The Kansas University Endowment Association, Lawrence, Kans., a corporation of Kansas
Filed Oct. 16, 1961, Ser. No. 145,313
7 Claims. (Cl. 188—1)

This invention relates to an impact vibration damper of a type suitable for reducing or eliminating vibrations in mechanisms. The invention relates more particularly to impact vibration dampers which are provided with control means for adapting the dampers to varying conditions.

It is well known that various power driven mechanisms are subject to forces during their operation which cause the mechanisms to vibrate in regular or irregular patterns. It is also well known that vibrations of this nature can result in a decrease of efficiency of the mechanisms and can cause severe damage and failure in the mechanisms or in associated parts.

Vibration dampers generally relate to devices which when fastened to vibrating bodies without any other rigid connections will reduce the vibration of the body to which they are attached. Known vibration dampers are generally divided into two main classes: energy-absorbing devices and reactive-force devices.

The energy-absorbing type of damper has been developed and used with considerable success. The greatest advantage of these devices is their simplicity and, even though they are not capable of completely eliminating vibration in operating mechanisms, they are generally suitable for reducing extreme vibrations. Typical examples of this type of damper are automobile crankshaft dampers and sliding friction in leaf springs. In addition to the fact that they will never completely eliminate vibrations, this type of damper additionally suffers from the disadvantage of creating heat in its operation.

The reactive-force class of damper is typified by the dynamic vibration absorber in which a small auxiliary mass, vibrating at a large amplitude, generates a reactive force that cancels out the exciting or vibrating force. The major advantages of this device include the fact that it can completely stop the motion of the body whose vibration is to be controlled and, furthermore, these devices do not generate heat in operation. An unfortunate disadvantage of this type of damper results from the fact that the vibration absorber must be exactly tuned to the frequency of the exciting force. If the vibration absorber is operated at a frequency other than that for which it is intended, it will, in many cases, be worse than useless, since it may introduce two resonant frequencies where only one existed without it. Such devices are, therefore, only applicable on constant speed machinery or in applications such as in the centrifugal pendulum balancers used in aircraft engine crankshafts, where a variable stiffness spring can be employed.

Impact vibration dampers can be designed to possess many of the characteristics of the dampers of the above described classes. The great advantage of impact vibration dampers resides in the fact that they are not sensitive to frequency and will give optimum performance over a wide range of frequencies without adjustment. Known devices of this type have been unacceptable for various reasons including the fact that they ordinarily generate an extremely unpleasant noise level resulting in the production of vibrations at a large number of harmonics of the exciting force.

In copending application Serial No. 142,883 of James B. Tiedemann entitled Impact Vibration Dampers, filed October 4, 1961, there is described an impact vibration damper which overcomes the defect relating to noise development characteristic of prior known dampers. The damper described in the copending application further provides a unit which is essentially frequency insensitive. Impact vibration dampers such as described in the copending case are, however, amplitude sensitive devices which become ineffective or unstable upon a significant change in the disturbance amplitude. In many instances, various mechanisms are subject to forces which produce varied vibration amplitudes, and it is therefore desirable that dampers such as described in the copending application be provided with means for adapting themselves to various vibration amplitudes. It is particularly desirable to provide control means which are capable of incorporation into the damper mechanism and which are still adapted for quick reaction to changes in disturbance amplitude.

It is, therefore, an object of this invention to provide an improved impact vibration damper and control means therefor which may be effectively employed in mechanisms which are subject to forces producing varied vibration amplitudes.

It is an additional object of this invention to provide a control means for impact vibration dampers, particularly of the type described in the aforementioned copending application.

It is a further object of this invention to provide a control means for impact vibration dampers which is capable of incorporation directly into the damper mechanism and which will quickly react to changes in disturbance amplitude whereby immediate recovery and adjustment of the system will result.

These and other objects of this invention will appear hereinafter and for purposes of illustration, but not of limitation, specific embodiments of this invention are shown in the accompanying drawings in which—

Figure 2:
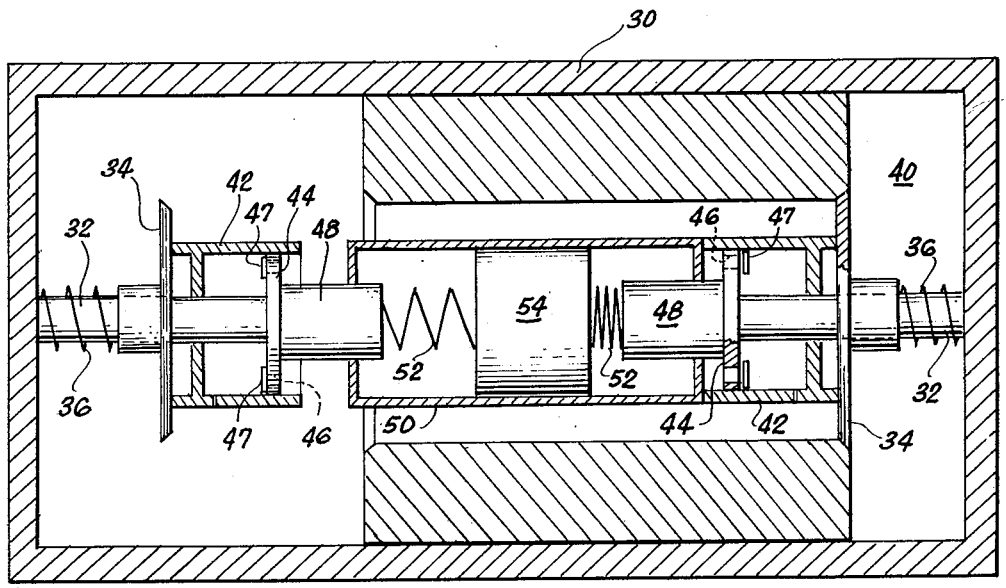

FIGURE 1 is a diagrammatic illustration of a control mechanism suitable for incorporation into an impact vibration damper whereby the damper will be operative at various amplitudes; and FIGURE 2 is a diagrammatic illustration of a modified version of a control mechanism which is incorporated into an impact vibration damper.

The dampers and control mechanisms of this invention will be described with reference to the dampers of the type described in said copending application wherein a hollow piston is reciprocally fitted within a casing and a pair of valves are resiliently mounted on either side of the piston within the casing for providing a pressure cushion for the piston as it reciprocates. It will be apparent, however, that other applications of the control systems to be described are possible and are therefore contemplated.

The control systems of this invention may be integrated with an impact vibration damper which is characterized by a casing adapted for attachment to a body subject to vibrations. A reactive mass is slidably fitted within the casing and a central passage is provided through the mass for passage of compressible fluid contained within the casing and to provide for incorporation of the control mechanisms. A pair of valves are resiliently positioned on mounting means on either side of the reactive mass and in spaced apart relation with respect to the end walls of the casing. The valve means are each adapted for closing off one end of the opening in the reactive mass whereby a cushion is provided for the mass as it slides against the valves. A more complete explanation of a damper of this type is provided in the aforementioned copending application.

As noted in the copending application, operation of the damper depends on the ratio of the clearance between the valves and the peak-to-peak amplitude of the vibrations. The control means of this invention provide for varying the distance between the valves contained within the impact vibration damper. Therefore, as the peak-to-peak amplitude of the vibration changes in the operation of a mechanism these control means will provide for a corresponding change in clearance of the valves, thus enabling maintenance of the necessary ratio.

The control mechanisms generally comprise means at either end of the damper casing for positioning the valves. Pistons are fitted within the valve positioning means to close off a space therein, and ports with their own valve means are formed in the pistons and are adapted for permitting ingress of a fluid into the space formed between the pistons and valve positioning means. Ingress of the compressible fluid contained within the casing takes place when the piston means and positioning means are moved relative to each other by a heavy mass positioned between the valve positioning means.

The valve means for the ports are adapted to prevent egress of the fluid when the heavy mass moves away from the valve positioning means, thus leaving the valve positioning means stationary. Thus, in a given vibratory cycle the heavy mass positioned between the valve positioning means is adapted to contact these means and to move them along with their associated valves an amount corresponding to changes in amplitude of the system.

A detailed explanation of the control mechanisms and their operation with respect to an impact vibration damper may be had when considering the accompanying drawings and the following description. FIGURE 1 illustrates an automatic control mechanism 10 comprising a casing 11 supporting therein a rod-like member 12. The rod-like member 12 is connected to the end walls 14 which may be the end walls of a casing such as is employed in dampers of the type described in the aforementioned copending application. Hollow chambers 16 are resiliently positioned about the member 12 by means of springs 18. Pistons 20, which are fixed to the member 12, slidably fit within the chambers 16. Ports 22 are provided on the pistons 20 and are fitted with check valves 24 which permit ingress of fluid contained within the damper casing. A heavy mass 26, movable with respect to the member 12, is located intermediate the chambers 16 and is resiliently mounted with respect to the pistons 20 by means of the springs 28.

The operation of this device results in the movement of the chambers 16 in accordance with contact of the mass 26. Specifically, the mass 26, being a body extremely heavy relative to the remaining portions of the mechanism, will remain essentially motionless as the damper casing vibrates. At the extremes of the movement of the damper casing, the mass 26 will contact the chambers 16, and this contact will cause movement of the chambers with respect to their pistons 20. This will force the chambers outward toward the end walls of the casing, cause the valves 24 to open and draw fluid into the chambers. When the mass 26 moves away from a chamber 16 the check valves 24 will close, thus trapping any fluid remaining therein. It will be apparent that this will leave the chambers 16 in a stationary position with respect to casing 11 until again contacted by the mass 26. Therefore, each of the chambers 16 will be set by the mass 26 once during each cycle of vibration and thus, setting of the chambers 16 will necessarily depend on the particular amplitude of a given vibration.

In order that the mechanism may adjust itself in a situation where the amplitude of vibration is decreasing, it is preferred that leakage be purposely permitted from the dash-pot chambers 16, thus producing a condition wherein the size of the chambers 16 will be constantly decreasing when out of contact with the mass 26. Tiny apertures 29 can be provided for this purpose and the chambers 16 will move inward until they again contact the mass 26.

This structure 10 provides a mechanical memory system in which the chambers 16 are reminded of the vibration amplitude once during each cycle by contact with the pilot mass. If the vibration amplitude should decrease, the leakage which is preferably provided in the system enables a slow forgetting process, permitting the chambers 16 to accommodate to this change in the vibration amplitude. Any change in the separation of the chambers 16 will thus correspond to a change in the peak-to-peak amplitude of vibration for a given cycle, and if the chambers 16 are caused to serve as positioning stops for the valves of an air-cushion damper, an automatic control system for adjusting the valve clearance by an amount proportional to this amplitude change will result.

FIGURE 2 illustrates a modified form of a control system, and shows how the system appears when incorporated into an impact vibration damper. The damper illustrated comprises a casing 30 having a centrally disposed rod 32 with valves 34 movably retained thereon. Springs 36 provide for normal positioning of the valves 34. A reactive mass is provided in the form of a piston 38, the mass acting to provide a damping effect as described in the aforementioned copending application. Briefly, the damping effect results when the mass 38 contacts the valves 34 and provides a sealed end 40 within the casing whereby an air cushion will provide for stopping of the piston and return to the opposite end of the case.

A control system for positioning the valves 34 as the amplitude of vibrations changes includes hollow chambers 42 acting as valve positioning means. Pistons 44 which are fixed with respect to the rod 32 and movable with respect to the chambers 42 are provided with ports 46 and check valves 47.

Piston extensions 48 pass into cylinder 50 and a heavy mass 54 is provided within the cylinder connected to the extensions 48 by means of springs 52.

With regard to the operation of the pistons 44 and associated ports and valves 46 and 47, it will be noted that movement of the chambers 42 to enlarge the space therein will cause opening of the check valves and ingress of fluid into the chambers. The check valves are adapted to close when the pistons 44 are stationary with respect to the chambers 42 and when the cylinder 50 moves away from the chambers 42.

The mass 54 contained within the cylinder 50 is great enough so that it will remain essentially motionless while the damper casing vibrates with the body whose motion is to be damped. This mass 54 thus serves as a miniature seismograph detecting the amplitude of vibration. As the damper casing moves to the left, the righthand piston extension 48 will be forced into the cylinder 50 displacing some of the fluid contained therein. The motion of the mass 54 will be negligible, however, the displacing of the fluid will cause the cylinder 50 to move to the right with respect to the damper casing.

As the cylinder moves to the right, it will contact the righthand valve positioning means which is the righthand chamber 42. This will move the chamber 42 with respect to the piston 44 causing fluid to be drawn into the chamber. As the damper casing begins movement to the right, the cylinder 50 will cease to contact chamber 42 but the fluid within the chamber 42 will cause the piston and chamber to remain in position. Since the righthand valve 34 is held in contact with chamber 42 by spring 36, its position will, therefore, be determined according to the amount of movement of the cylinder 50. It will be apparent that as in the previous case, means are provided for repositioning the chambers 42 and accordingly the valves 34 once during each vibratory cycle. Also as in the previously described embodiment, it is preferable that a small amount of fluid be permitted to leak from the chambers 42 whereby the valves 34 will move in response to the urging of springs 36 toward the center of the casing when decreases in amplitude occur.

As noted in the aforementioned copending application, the ratio of piston clearance to peak-to-peak vibration amplitude should lie between about 0.5 and 2.0. A ratio of one to one is usually suitable, and may be obtained with the simple mechanism of FIGURE 1. Other ratios may be obtained if desired by adjusting the diameters of mass 54, piston 48, and the corresponding surfaces of cylinder 50 in the mechanism of FIGURE 2.

The factors which regulate the control mechanism response include the weight ratios of the heavy mass employed in the control when compared with the valves and valve positioning means. The weight of the mass should be such that contact with the positioning means will not move the mass appreciably and its seismographic character will not be destroyed. Furthermore, the amount of friction between the various members and the amount of leakage within the system will affect the operation, although these factors have not been found to be extremely critical. This is believed to be due to the fact that at any reasonably high frequency the resetting process will occur so rapidly that rather loose fits are possible without excessive leakage problems. Another factor upon which the operation of the FIGURE 2 embodiment depends is the diameter of the extension 48 which extends into the cylinder 50. Obviously changes in this diameter will result in variation in the amount of displaced fluid and accordingly variations in the degree of movement of the cylinder 50.

Tests of the control instruments have indicated that some friction or viscous damping between the reactive mass 54 and its cylinder 50 is desirable to stabilize the motion of the apparatus and to eliminate transient effects therein.

An automatic control system in which the clearance is equal to the peak-to-peak amplitude is, as above noted, the preferred system, and it has been determined that the device will not operate if the clearance is set greater than twice the peak-to-peak response. A mass ratio of 0.20 will limit the resonance response to three times the foundation amplitude in an otherwise undamped system, but mass ratio in excess of 0.20 produces little improvement in the performance. Thus a piston mass equal to 1/10 of the mass of the vibrating body has been determined to be a satisfactory design standard.

Noise and harmonic excitation are greatly reduced due to the fact that the above described mechanisms employ an air cushion in place of direct mechanical impact at the ends of the casing. Furthermore, the described systems effectively reduce amplitude sensitivity by incorporating an automatic control system directly within the apparatus. The operation of the apparatus has been described with reference to the use of a fluid which may be incompressible as well as compressible, and it will be understood that air, gases and various other fluids whose compressibility may or may not be enhanced by elastic reservoirs are contemplated for use in the device.

It will also be understood that various modifications may be made in the above described systems which provide the characteristics of this invention without departing from the spirit thereof, particularly as defined in the following claims.

We claim:

1. A vibration damper comprising a casing adapted for attachment to a body subject to vibrations, a reactive mass slidably fitted within said casing, said mass having a central passage therethrough, mounting means secured to said casing, valve means resiliently positioned on said mounting means on either side of said reactive mass in spaced apart relation with respect to the end walls of said casing, said valve means each being adapted to close off one end of said central passage when said reactive mass slides against the valve means, control means for varying the distance between said valve means in accordance with the amplitude of vibrations to which said body is subjected, said control means including shut-off means fixed to said mounting means, ports in said shut-off means for passage of fluid therethrough and means for periodically closing off said ports, hollow valve positioning means fitted in gas-tight relation about said shut-off means, a hollow cylinder fitted within said central passage, extension means on said shut-off means slidably extending into either end of said cylinder and a heavy mass slidably fitted within said cylinder and resiliently connected to said extension means, means whereby movement of said pistons into said hollow cylinder will displace fluid therein and cause said hollow cylinder to move relative to said heavy mass toward said valve positioning means and whereby contact of said hollow cylinder with one of the valve positioning means will cause movement of its associated valve toward the end wall of said casing and entrance of fluid between said shut-off means and said valve positioning means through said ports will result in retention of the valve positioning means until these means are again moved by said hollow cylinder.

2. A vibration damper according to claim 1 wherein the mass within said hollow cylinder is heavier than said cylinder by an amount whereby said mass will remain substantially stationary while the cylinder moves toward and away from said valve positioning means.

3. A vibration damper according to claim 1 wherein a small leak opening is provided in said valve positioning means whereby a means is provided for leaking of fluid therefrom for constantly enabling movement of said valves in a direction toward said heavy mass.

4. A vibration damper comprising a casing adapted for attachment to a body subject to vibrations, a reactive mass slidably fitted within said casing and having a central passage therethrough, mounting means secured to said casing, valve means resiliently positioned on mounting means on either side of said reactive mass in spaced apart relation with respect to the end walls of said casing, said valve means each being adapted to close off one end of said central passage when said reactive mass slides against the valve means, control means for varying the distance between said valve means in accordance with the amplitude of vibrations to which said body is subjected, said control means including piston means fixed to said mounting means, ports in said piston means for passage of fluid therethrough and means for periodically closing off said ports, hollow valve positioning means fitted in fluid-tight relation about said piston means, a hollow cylinder fitted within said central passage, said piston means slidably extending into either end of said cylinder and a heavy mass slidably fitted within said cylinder and resiliently connected to said piston means whereby movement of said pistons into said hollow cylinder will displace fluid therein and cause said hollow cylinder to move relative to said heavy mass toward said valve positioning means and whereby contact of said hollow cylinder with one of the valve positioning means will cause movement of its associated valve toward the end wall of said casing and entrance of fluid between said piston means and said valve positioning means through said ports will result in retention of the valve positioning means until these means are again moved by said hollow cylinder.

5. In an impact vibration damper for attachment to a body subject to vibration which includes a hollow piston of relatively great mass reciprocally fitted within a casing, a fluid contained within said casing, mounting means secured to said casing and a pair of valves slideably and resiliently mounted on said mounting means for providing a pressure cushion for said piston as it reciprocates within said casing, the improvement comprising control means for varying the distance between said valve means in accordance with the amplitude of vibrations to which said body is subjected, said control means including pistons fixed on said mounting means, ports defined in said pistons for passage of fluid therethrough, and means for periodically closing off said ports, valve positioning means fitted in fluid-tight relation about said piston means, said valves being fixed to said positioning means, a hollow cylinder fitted within the hollow portion of said reciprocal hollow piston, the piston means fixed on said mounting means slideably extending into each end of said cylinder, and a heavy mass slideably fitted within said cylinder and resiliently connected to said piston means whereby movement of the said piston means into said hollow cylinder will displace fluid therein and cause said hollow cylinder means to move relative to the heavy mass therein toward said valve positioning means and whereby contact of said hollow cylinder with one of the valve positioning means will cause movement of its associated valves toward the end walls of said casing, and entrance of fluid between said piston means and said valve positioning means through said ports will result in retention of the valve positioning means until these means are again moved by said hollow cylinder.

6. In an impact vibration damper for attachment to a body subject to vibrations which includes a hollow piston reciprocally fitted within a casing, a compressible fluid contained within said casing, mounting means secured within said casing, and a pair of valves reciprocally mounted on said mounting means within the casing for providing a pressure cushion for said piston as it reciprocates within said casing, the improvement comprising control means for varying the distance between said valves in accordance with the amplitude of vibration to which said body is subjected, said control means including valve positioning means at either end of said casing, said positioning means being fitted on said mounting means and moveable with respect to said casing, and said valves being secured to said positioning means, piston means fitted within said positioning means and closing off a space therein, ports in said piston means adapted to permit ingress of the compressible fluid into said space when relative movement of said piston means and positioning means causes enlargement of said space, said ports also being adapted to prevent egress of compressible fluid from said space when the piston means and positioning means are stationary relative to each other, and a mass positioned between said positioning means adapted to contact said positioning means and to cause relative movement between said piston means and said positioning means whereby said space will be enlarged when said body is vibrating whereby the valves may be repositioned.

7. A vibration damper according to claim 6 including means for normally urging said valves toward said mass and wherein a small leak opening is provided for said space whereby a means is provided for leaking of compressible fluid therefrom, thus constantly enabling movement of said valves in a direction toward said heavy mass.

References Cited in the file of this patent
UNITED STATES PATENTS

| | | |
|---|---|---|
| 656,232 | Westinghouse | Aug. 21, 1900 |
| 2,854,100 | Bowser et al. | Sept. 30, 1958 |
| 2,936,860 | Peras | May 17, 1960 |